Nov. 9, 1943.    J. M. AKELAITIS    2,333,759
PHOTOMETRIC DEVICE
Filed Aug. 22, 1940    2 Sheets-Sheet 1
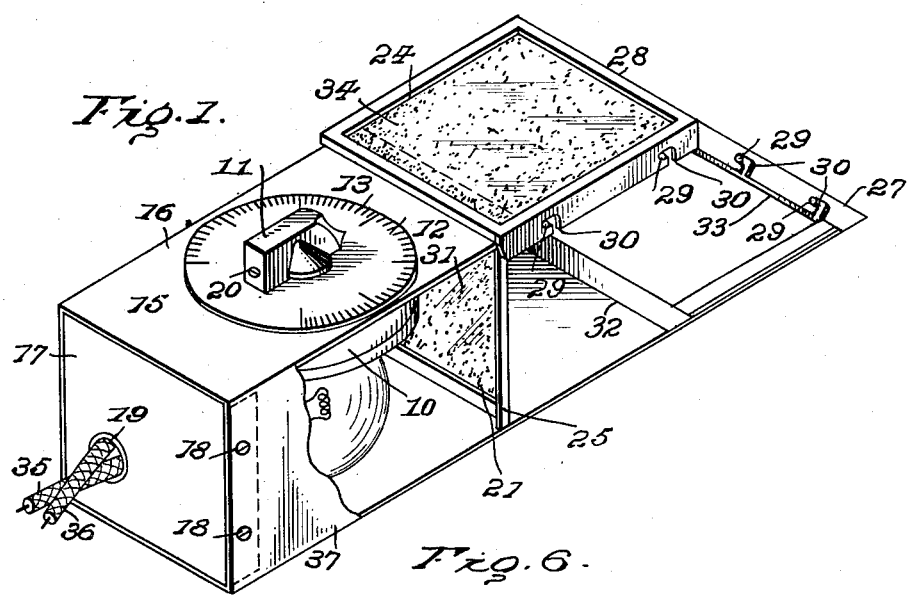
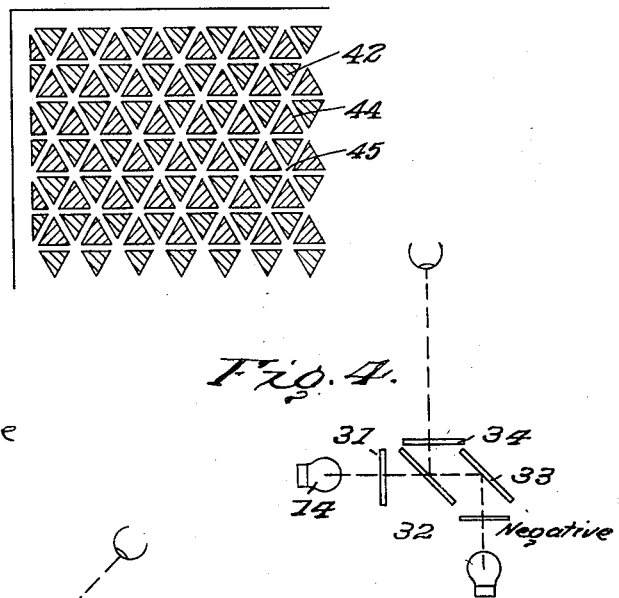
Inventor
Joseph M. Akelaitis
By J. T. Dowling
Attorney Nov. 9, 1943.   J. M. AKELAITIS   2,333,759
PHOTOMETRIC DEVICE
Filed Aug. 22, 1940   2 Sheets-Sheet 2

Inventor
Joseph M. Akelaitis
By J. T. Dowling
Attorney

Patented Nov. 9, 1943

2,333,759

UNITED STATES PATENT OFFICE 2,333,759

PHOTOMETRIC DEVICE

Joseph M. Akelaitis, Baltimore, Md.

Application August 22, 1940, Serial No. 353,732

4 Claims. (Cl. 88—14)

This invention is directed to an improvement in photometric devices, and more particularly concerned with a universal densitometer for determining and measuring the densities of film negatives or of negative transparencies from the projections of an enlarger.

The primary object of the present invention is the provision of a scored mirror, the mirrored surface of which is interrupted by thin slit-like transparent areas dividing the mirror surface into a multitude of triangular silver surfaces with proximate hexagonal openings of clear glass at the junction of their apices, with the scored mirror arranged in the reflective area of the transparencies and the reflective area of an independent and controllable source of illumination.

A further object of the invention is the provision of a translucent screen on which the density indicating reflections may be viewed, thus providing particularly that the transmitted textures appear very much brighter to the eye than where densities are viewed by reflections from the surface of the mirror.

A further object of the invention is to provide a large visible field for the integration of the transparencies, whereby successive density areas may be determined as to density values without shifting the instrument or the negatives.

A further object of the invention is to provide a visible field which is capable of being scanned by binocular vision.

The invention is illustrated in the accompanying drawings in which

Figure 1 is a perspective view of the densitometer, parts being broken out and the details of the optical system being omitted for clearness.

Figure 4 is a diagrammatic view showing the mirror system for measuring densities with a direct printer's light source.

Figure 5 is a diagrammatic view of the mirror system with the parts arranged in positions adapting the instrument for measuring densities by the light source of an enlarger.

Figure 6 is a broken elevation of the scored mirror.

Figure 2:
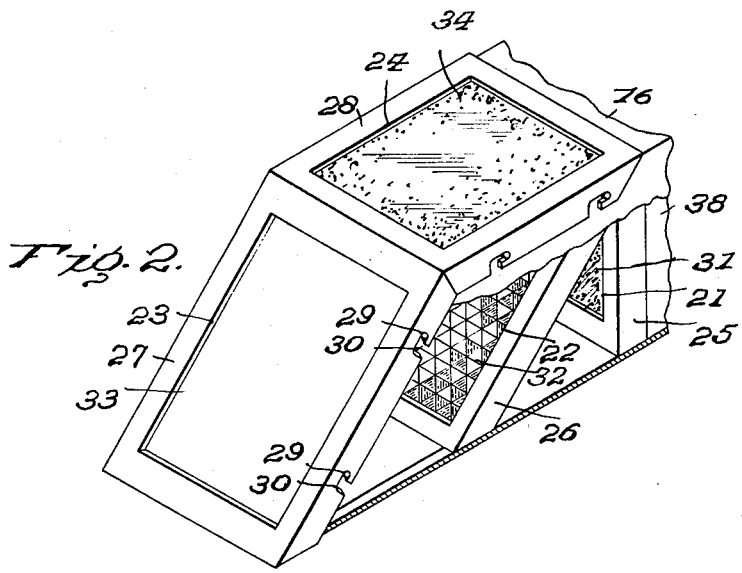
Figure 2 is a perspective view of the optical head in completed form and showing the parts arranged in position for use of the instrument with a horizontal projection printing apparatus.

The improved densitometer includes a casing comprising side walls 37 and 38, a forward end wall 17 and top, bottom and rear walls which will be more particularly described hereinafter. Mid-length of the casing there is secured to the side walls a frame 25 defining a central opening 21 in which is arranged a diffusing glass 31. In advance of the diffusing glass there is provided a conventional socket for the reception of a lamp 14, the energizing circuit of which is indicated at 35 and 36, led through the light-sealing gasket 19. A rheostat 10 is arranged in the lamp circuit, which, without excluding other and conventional operative structure, is preferably of a linear tapered type including a shaft which in rotation controls the voltage to the lamp. The upper wall or top of the casing overlying the lamp and rheostat is indicated at 16 and is formed to provide a graduated dial 12 cooperating with an indicator 11 secured to the rheostat shaft by set screw 20 and adapted to be manually rotated to control the rheostat and cooperate with the scale markings, which scale markings are calibrated to give direct density measurement readings instead of lamp voltage indications.

The parts described constitute what will be hereinafter referred to as a light head, indicated generally at 15, the illumination of which is manually controllable in indicated measurements of density, with the control light rays directed to and through the diffusing glass 31 as will be more particularly apparent from Figure 1 of the drawings.

In rear of the diffusing glass 31 with respect to the light head there is arranged what will be hereinafter termed the optical head illustrated more particularly in Figures 2 and 3. This optical head includes a frame 27, providing an opening 23 in which is arranged a mirror 33 having its reflecting area toward the interior of the casing. This frame and mirror constitute the normal rear wall of the casing, but, for purposes which will be later explained, this reflecting mirror and frame are removably connected to the casing through the medium of appropriate slots 30 in the side walls of the frame 27 cooperating with pins 29 projecting from the side walls 37 and 38 of the casing. From the form of the slots it will be apparent that when in operative position, the frame and rear mirror are substantially fixed as part of the casing, but may be readily and conveniently removed at will.

In advance of the rear mirror and disposed in the plane of the top of the casing, is a viewing screen including a frame 28 formed with an opening 24 and carrying a translucent screen or ground glass 34. The frame 28 is removably connected to the side walls 37 and 38 through the medium of slots and pins in the manner previously described in connection with the rear mirror.

Figure 3:
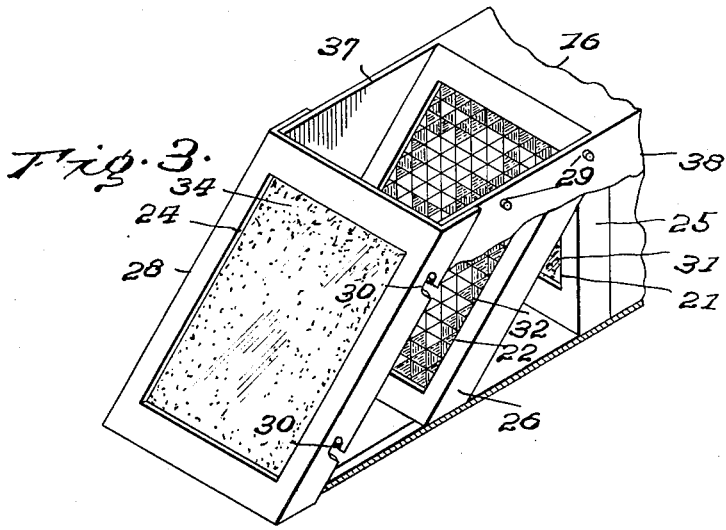
Figure 3 is a similar view of the optical head, the parts arranged in positions for use with a direct printing apparatus.

The viewing screen is normally parallel to the bottom wall of the casing, as shown in Figure 2, but the relation of its connecting means is such that the viewing screen may be removed from the described position and substituted for the removed rear mirror frame 27, as indicated in Figure 3.

An important characteristic of the present invention is the provision of what will be termed a scored mirror. The scored mirror includes a frame 26 formed with a central opening 22 and arranged at an angle to the bottom and top of the casing, and in parallelism with the rear mirror 33, as normally arranged. The upper end of the frame leads from the upper end of the diffusing glass 31 and downwardly to the bottom of the casing at approximately an angle of 45°. The scored mirror 32 is arranged within the opening in the frame and is of a particular construction which is of critical importance in valuating the density of the transparencies investigated.

As will be apparent from Figure 6 of the drawings, the scored mirror has its reflective area on the upper side with this reflective area divided by uniformly thin slits 44 which divide the silver or reflecting area of the mirror into a multitude of triangular silver surfaces. The intersections of the thin slits 44 at the apices of the triangular silver surfaces provide approximately hexagonal openings 45.

It is to be noted that the radial slits in the scored mirror are less in breadth than the diameter of the areas or openings 45 at the apices of the triangular formed reflecting areas. This has a definite object which will later appear. The function of the scored mirror is distinguished from that of the concentric fields conventionally employed in densitometers in the provision of two reference steps such as the transparent spots at the apices of the triangular silvered areas and the radial transparent slits conterminous to one another, and adjacent to the silvered areas. As the radial slits are less in breadth than the diameter of the spots or openings, they naturally admit less light and become perceptively extinct before the spots as the peak of equal illumination is approached, when the field of light from the transparency being tested is matched by the field of light transmitted from the light source.

In the use of the instrument, and assuming the parts are arranged as shown in Figure 2, the negative image will appear clear and sharp on the ground glass from the reflections, such image being divided into a multitude of areas by the series of radial slits and central spots which emit the controlled light from the source behind the scored mirror. The intensities of these areas, that is, the slits and spots, can be altered until the lines and the approximate hexagon spots in turn seem to dissolve in the selected area of the negative under measurement. This occurs when the intensity of the light within the slits and spots and the density of that area of the negative are identical and gives the appearance that that area of the negative is entirely reflected and does not break into triangular areas. This procedure enables the operator of the controlled light to measure the densities of the selected part of the negative very rapidly, and it is possible to make successive measurements on the different densities of the negative image within the boundaries of the scored mirror, one for the shadow details, that is, the nearly transparent areas of the negative, another for various intermediate densities, and another for the high lights, that is, the most opaque areas of the negative. This is continued until a satisfactory range of the negative is ascertained. The more identical areas of the negative appear at the same time. Therefore, a more rapid integration of the negative image is possible without shifting the instrument about.

The actual purpose of the radial slits is to augment the sensitivity of the central spots, because the normal eye is not susceptible to small changes in quantity of light unless there are indices with which to form a comparison.

The manual operation of the indicator may bring about an increased component of light that admits increased brightness from the transparent portions of the scored mirror and correspondingly decreases the component of light reflection from the negative. There is thus shown on the viewing screen a veiling glow, and the transparent portions of the scored mirror will become invisible in this glow whenever the pattern of the negative has equal density to the intensity of the light, and these transparent areas will be sharply outlined whenever the density is more opaque than the intensity of the light. The contrast between the lights is then decreased until any intermediate densities result in the vanishing of the greater areas of the scored mirror when the scale indication of the pointer will indicate the density of the particular area investigated.

The contrasts between the lights can be thus controlled until the measurement of all the densities is secured and until the point is reached where the light component from the transparent areas of the scored mirror is decreased below the intensity of the reflection of the light from the transparency. At this point the indication of the silvered area will predominate in brilliancy. This indicates an inequality between the intensity of light through the transparent areas of the scored mirror and the reflective intensity from the negative.

Where the device is used to measure densities in a transparency from a position above the optical head, the plane mirror 33 is removed and the viewing screen substituted therefor, the control of the instrument being as previously described.

In connection with the scored mirror it is noted that the radial slits are less in breadth than the diameter of the openings at the juncture of the slits. Therefore, the slits admit less light and become extinct so far as visibility is concerned, before the openings or spots as the peak of equal illumination is approached in matching the field of light from the tested transparency to the field of light from the light source. Until the conformity of these fields diminishes in intensity from the transmitted light, the radial slits become immediately responsive as defining the silvered reflected areas and their visibility outlined before the spots or openings. This will obviously indicate that the peak of equal illumination has been passed and thus the slits afford another reliable criterion of measurement, and increase the selectivity of the proper peak of equal illumination from both fields by the stated indication when this field is approached or passed.

In order to obtain the best efficiency, it is desirable that the light transmitted through the scored mirror should remain constant and of spectral quality. This may be attained by the use of colored globes for the lamp or filters in the light compartment.

What is claimed as new is:

1. A densitometer, including a substantially rectangular casing, a light source at one end of the casing, a scored mirror in the casing and arranged at an angle other than a right angle to the upper and lower walls thereof, a plain mirror removably connected at the other end of the casing and in spaced substantially horizontal alinement with the scored mirror, the lower wall of the casing being formed to admit light rays from beneath the casing to the plain mirror, and a vision screen removably mounted in the top wall of the casing in line with and covering the space between the scored mirror and plain mirror to permit vision of light rays passing through the scored mirror from the light source, and light rays passing through a transparency and reflected from the plain mirror, with the transparency in one position, the vision screen being designed to be substituted for the plain mirror at will for testing transparencies from another position.

2. A construction as defined in claim 1, wherein the bottom of the casing for the full length between the scored mirror and plain mirror is open to permit entrance of light rays passing through a transparency from below the casing and to the plain mirror.

3. A construction as defined in claim 1, wherein a diffusion glass is arranged between the light source and scored mirror.

4. A construction as defined in claim 1, wherein the scored mirror is formed with transparent areas including narrow slits surrounding triangular reflecting areas.

JOSEPH M. AKELAITIS.